United States Patent [19]
Churchill

[11] Patent Number: 5,464,085
[45] Date of Patent: Nov. 7, 1995

[54] SOLENOID OPERATED HYDRAULIC VALVE

[75] Inventor: Stephen J. Churchill, Basildon, England

[73] Assignee: New Holland North America, Inc., New Holland, Pa.

[21] Appl. No.: 226,745

[22] Filed: Apr. 12, 1994

[30] Foreign Application Priority Data

Apr. 13, 1993 [GB] United Kingdom ............. 9307537

[51] Int. Cl.⁶ .................................... F16D 25/12
[52] U.S. Cl. ................ 192/85 R; 137/468; 91/419; 60/329
[58] Field of Search ............ 192/85 R; 137/468; 91/419; 60/329

[56] References Cited

U.S. PATENT DOCUMENTS

| | | | |
|---|---|---|---|
| 3,530,958 | 9/1970 | Brannon et al. | 60/329 X |
| 3,738,609 | 6/1973 | Dirigard | 91/419 X |
| 4,037,697 | 7/1977 | Prenzel | 60/329 X |
| 4,678,069 | 7/1987 | Yoshimura et al. | |
| 4,796,739 | 1/1989 | Jonner et al. | 192/85 R |
| 4,813,443 | 3/1989 | Pounder | 137/468 X |
| 5,023,789 | 6/1991 | Lampe et al. | |
| 5,083,648 | 1/1993 | Bulgrien | |

FOREIGN PATENT DOCUMENTS

| | | | |
|---|---|---|---|
| 0193412 | 9/1986 | European Pat. Off. | |
| 59-17001 | 1/1984 | Japan | 91/419 |
| 5-231553 | 9/1993 | Japan | 137/468 |
| 2018413 | 2/1983 | United Kingdom | |

*Primary Examiner*—Richard M. Lorence
*Attorney, Agent, or Firm*—Larry W. Miller; Frank A. Seemar

[57] ABSTRACT

A solenoid operated hydraulic valve for supplying a regulated hydraulic pressure to a load in dependence upon an electrical demand signal applied to the valve. The valve is operable to sense the temperature of the hydraulic fluid flowing through the valve and to determine the current applied to the valve solenoid in dependence upon both the demand signal from a sensor and the sensed temperature such that the regulated pressure supplied to the load is dependent only on the demand signal and is substantially independent of the temperature of the hydraulic fluid.

5 Claims, 2 Drawing Sheets

SOLENOID OPERATED HYDRAULIC VALVE

BACKGROUND OF THE INVENTION

The present invention relates to a pressure regulating solenoid operated hydraulic valve.

In certain applications, for example for actuation of a clutch in an agricultural or industrial tractor, a hydraulic valve is required that can deliver a regulated pressure in response to an applied electrical control signal. For this purpose, hydraulic valves are known that have a valve spool slidably mounted within a housing. The spool has lands that cooperate with ports in the housing to vary the flow between a pressure supply line, a line leading to the load to be supplied and a return line to a reservoir or tank. One end of the spool is acted upon by the pressure in a control chamber and the other is acted upon in the opposite direction by a spring. The position of the spool in the housing can therefore be set by varying the pressure in the control chamber and this in return regulates the pressure supplied to the load.

The control chamber of the spool valve is permanently connected to a pressure source and is also connected to the return line by way of a solenoid operated valve. The latter valve comprises a ball urged against a valve seat by the armature of a control solenoid of the spool valve. The greater the current flowing through the solenoid, the greater is the force applied by the armature to urge the ball against its seat and therefore the greater is the pressure in the control chamber. Thus force exerted by the solenoid determines the pressure in the control chamber, this in turn determines the position of the valve spool in the housing and therefore the pressure of the hydraulic fluid supplied to the load.

SUMMARY OF THE INVENTION

The present invention provides a solenoid operated hydraulic valve for supplying a regulated hydraulic pressure to a load in dependence upon an electrical demand signal applied to the valve, the valve having means for sensing the temperature of the hydraulic fluid flowing through the valve and means for determining the current applied to the valve solenoid in dependence upon both the demand signal and the sensed temperature such that the regulated pressure supplied to the load is dependent only on the demand signal and is substantially independent of the temperature of the hydraulic fluid.

The invention is based on the discovery that, contrary to normal expectations, the pressure supplied to the load with certain valve designs is dependent upon the temperature of the hydraulic fluid flowing through the valve. By providing negative feedback from the sensed temperature of the hydraulic fluid, it is the object of the present invention to allow for temperature compensation to be implemented in a simple and inexpensive manner avoiding the need to use more complex and costly designs of hydraulic valves that do not suffer from this problem.

The feedback can be achieved using analogue circuitry but it is more convenient and effective to implement the feedback control using digital circuitry or a micro-processor. A look-up table may be stored in memory to indicate the correction that must be applied to the control current of the valve solenoid at any given temperature to achieve temperature compensation.

These and other objects, features, and advantages are accomplished according to the instant invention by providing a solenoid operated hydraulic valve for supplying a regulated hydraulic pressure to a load in dependence upon an electrical demand signal applied to the valve. The valve is operable to sense the temperature of the hydraulic fluid flowing through the valve and to determine the current applied to the valve solenoid in dependence upon both the demand signal from a sensor and the sensed temperature such that the regulated pressure supplied to the load is dependent only on the demand signal and is substantially independent of the temperature of the hydraulic fluid.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
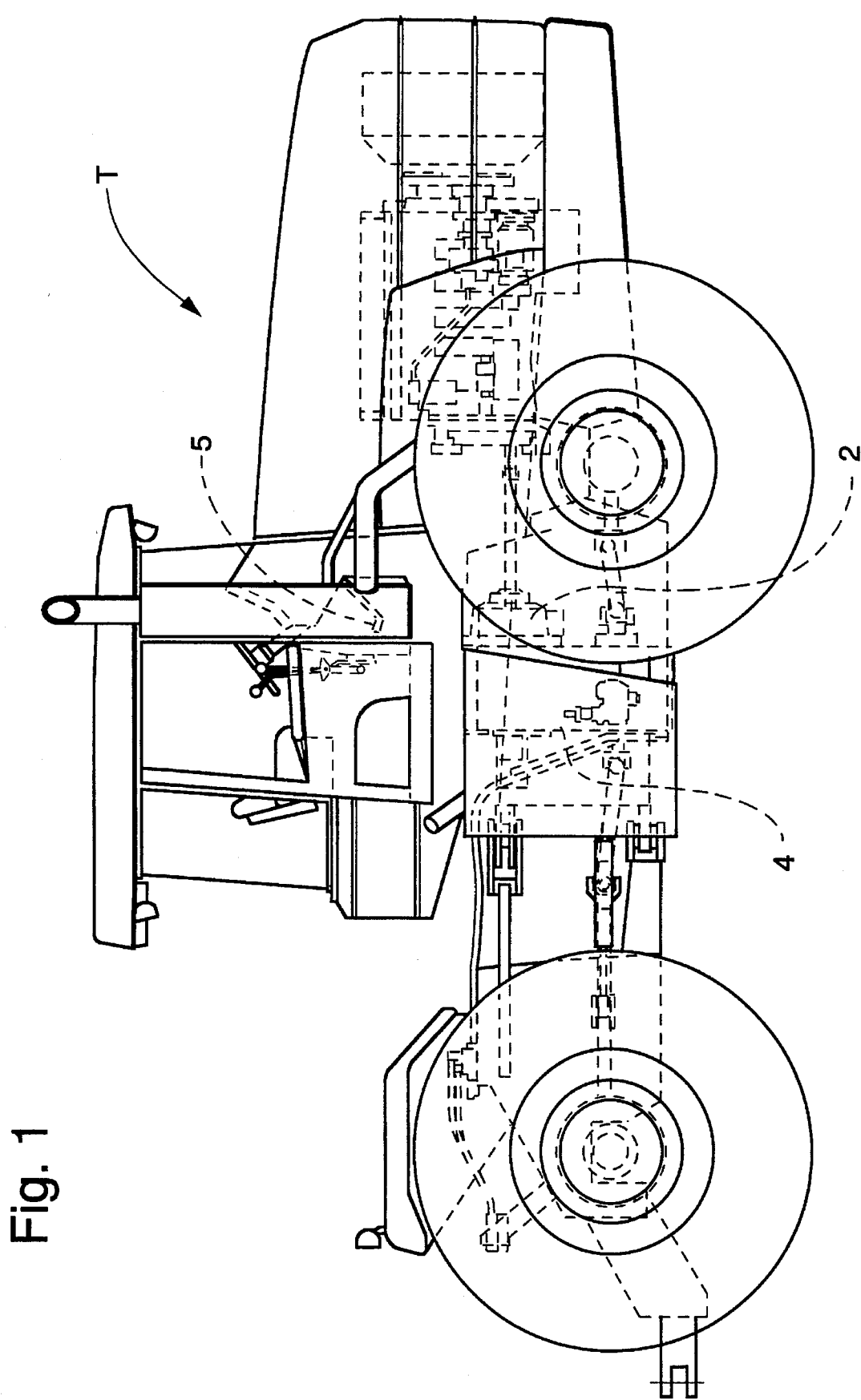
FIG. 1 is a schematic side elevational view of a representative self-propelled agricultural tractor having an engine, clutch pedal, transmission and transmission clutch shown in dashed lines.

The blocks 10 and 12 represent a conventional hydraulic valve and its operating solenoid, respectively. The hydraulic valve 10 may for example be a spool valve slidably axially in a housing to control the connection between a first port leading to a pressure supply pump, a second port leading back to the supply reservoir tank or drain and a third port leading to the supplied load. The pressure in the line leading to the load will depend upon the position of the spool.

The spool is acted upon at one end by a spring and at the other end by a control pressure set by the force exerted by its valve solenoid 12. The control pressure is developed in a chamber that is internally connected to the pressure supply line and from which fluid is spilled back to the line leading back to the reservoir tank through a ball valve of which the ball is urged against its valve seat by the force of the operating solenoid 12. Because such a hydraulic valve and its operating solenoid are well known per se, they do not require further description within the context of the present application and it is for this reason that their internal construction has not been illustrated in detail in the drawings. It should also be emphasised that the invention is not restricted to this form of valve but may be applied to any solenoid valve in which the supplied pressure varies with the temperature of the hydraulic fluid.

Figure 2:
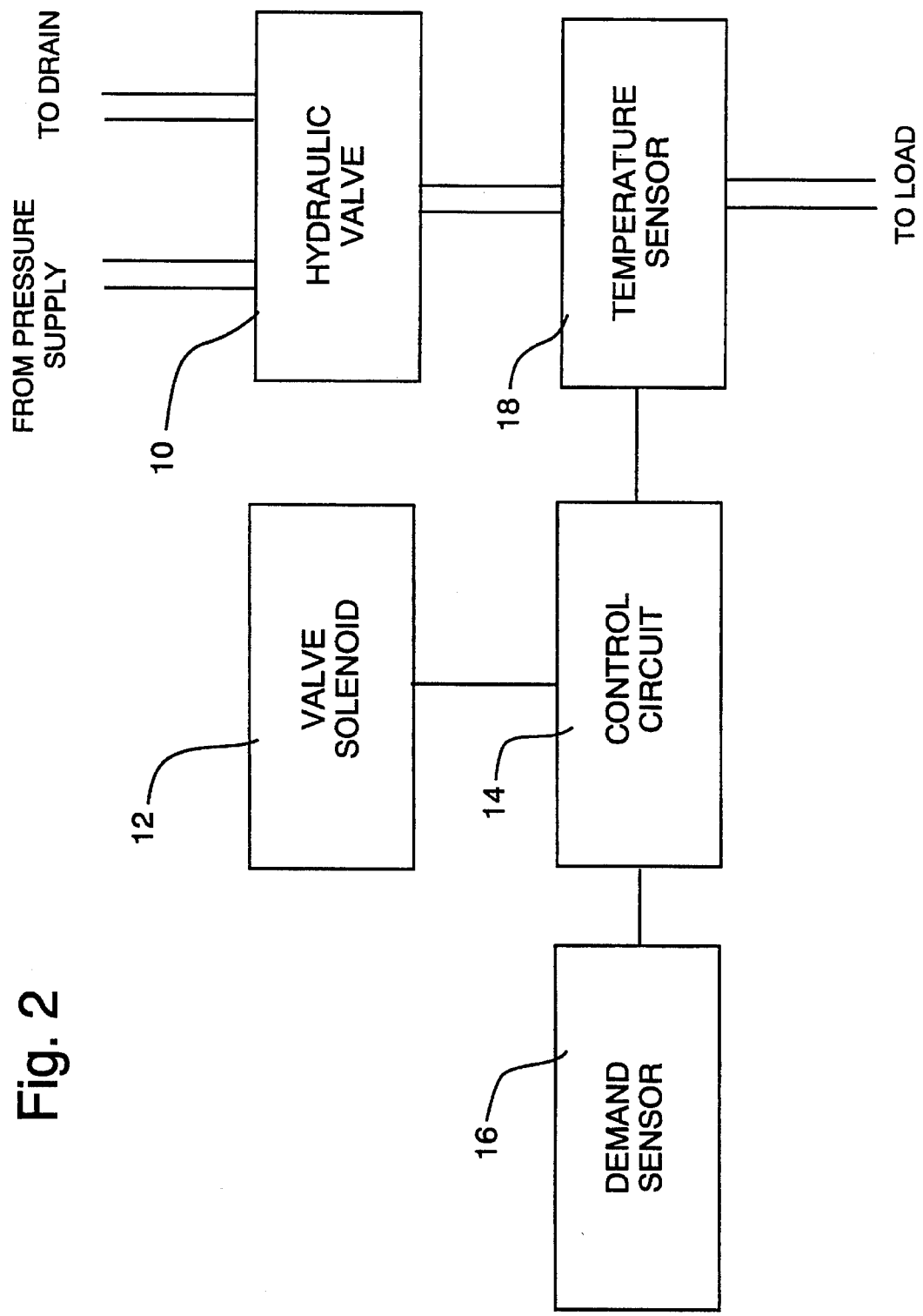
FIG. 2 is a block diagram of a valve incorporating the principles of the instant invention.

FIG. 2, represents a valve as used to control the supply fluid under pressure to a clutch actuator in a tractor transmission. A demand sensor 16 senses the position of a clutch pedal depressed by the driver and supplies a signal to a control circuit 14. The latter circuit in turn produces a driving current for the solenoid 12 determined by the signal from the demand sensor 16.

As so far described, the valve 10 and its control circuitry are conventional and they are extensively used in agricultural and industrial tractors T, as representatively depicted in FIG. 1, to operate various clutches 2 within the transmission 4. It has however been found that the position of the clutch pedal 5 at which the clutch 2 begins to bite can vary with operating temperature. This phenomenon is very inconvenient and annoying for a tractor driver in as much as he normally is familiarized with the behaviour of the tractor clutch 2 in response to the degree of actuation of the clutch pedal 5 and therefore cannot accept that said behaviour varies dependent on the temperature of the oil controlling the clutch actuator. Especially when inching the tractor T towards an implement (not shown) to be attached, the tractor operator carefully has to control the position of the clutch pedal 5 in order not to run into the implement or injure any person helping him to attach the implement to the tractor T. Under such operating conditions, the position of the clutch pedal 5 at which the clutch 2 begins to bite is essential and it will be appreciate that an experienced and skilled tractor driver, who is used to drive with the same tractor T and consequently has developed a sensitivity for the clutch pedal 5 behaviour, prefers not to be confronted with varying behaviours caused by fluctuating oil temperatures.

To mitigate the above problem, the invention provides a temperature sensor for sensing the temperature of the hydraulic medium, the sensor 18 being shown in the FIG. 2 as being located in the line leading from the valve 10 to the load. The output of the sensor 18 is supplied to the control circuit 14 which now applies temperature compensation to the driving current supplied to the valve solenoid 12 so that the fluid pressure should be the same at all temperatures for a given position of the clutch pedal 5.

The control circuit may be a known analogue circuit constructed as a summation or a multiplication circuit but it is preferred to use a micro-processor containing a look-up table giving the required value of the solenoid current at different temperatures and different values of the demand signal from the demand sensor 16. The values can be stored in the memory simply after calibration and consequently the control circuit does not require extensive adaption to suit valves with different temperature characteristics. The calibration of the values stored in the look-up table can also determine the manner in which the pressure supplied to the clutch 2 varies with pedal 5 position.

Having thus described the invention, what is claimed is:

1. In a self-propelled agricultural vehicle having a clutch pedal and a solenoid operated hydraulic valve for supplying a regulated hydraulic pressure to a load in dependence upon an electrical demand signal applied to the valve, the improvement comprising:

a demand sensor generating said electrical demand signal having a value being proportional to the position of said clutch pedal;

means for sensing the temperature of the hydraulic fluid flowing through said valve; and means for determining the current applied to the valve solenoid in dependence upon both said electrical demand signal and the sensed temperature such that the regulated pressure supplied to the load is dependent only on said electrical demand signal and is substantially independent of the temperature of the hydraulic fluid.

2. The solenoid operated hydraulic valve of claim 1 wherein said means for determining the current applied to the valve solenoid comprises a micro-processor having a memory in which there is stored a look-up table for setting the current applied to the solenoid.

3. The solenoid operated hydraulic valve of claim 2 wherein said means for sensing the temperature are incorporated in the hydraulic circuit between said hydraulic valve and a clutch actuator.

4. The solenoid operated hydraulic valve of claim 3 wherein the condition of the clutch actuator is independent of the temperature of the hydraulic fluid supplied thereto and corresponds to the position of the clutch pedal.

5. The solenoid operated hydraulic valve of claim 3 wherein the pressure of the hydraulic fluid supplied to the clutch actuator is the same at all temperatures of said fluid for a given position of the clutch pedal.

* * * * *